(12) United States Patent
Watson et al.

(10) Patent No.: US 10,104,423 B2
(45) Date of Patent: Oct. 16, 2018

(54) MULTIMEDIA SERVICE MIRRORING

(71) Applicant: Ruckus Wireless, Inc., Sunnyvale, CA (US)

(72) Inventors: Ted Andrew Watson, Sunnyvale, CA (US); Matthew Fitzgerald, Sunnyvale, CA (US); Yogesh Ranade, Sunnyvale, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

(21) Appl. No.: 14/975,180

(22) Filed: Dec. 18, 2015

(65) Prior Publication Data

US 2016/0286265 A1 Sep. 29, 2016

Related U.S. Application Data

(60) Provisional application No. 62/139,590, filed on Mar. 27, 2015.

(51) Int. Cl.
| | | |
|---|---|---|
| H04N 21/84 | (2011.01) | |
| H04N 21/436 | (2011.01) | |
| H04W 4/00 | (2018.01) | |
| H04L 29/08 | (2006.01) | |
| H04N 21/4363 | (2011.01) | |
| H04N 21/41 | (2011.01) | |
| H04N 21/214 | (2011.01) | |
| H04N 21/258 | (2011.01) | |
| H04W 4/80 | (2018.01) | |
| H04N 21/414 | (2011.01) | |

(52) U.S. Cl.
CPC ... *H04N 21/43615* (2013.01); *H04L 67/1095* (2013.01); *H04N 21/2143* (2013.01); *H04N 21/25816* (2013.01); *H04N 21/4122* (2013.01); *H04N 21/4126* (2013.01); *H04N 21/41407* (2013.01); *H04N 21/43635* (2013.01); *H04N 21/43637* (2013.01); *H04W 4/008* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 8,875,179 B2 * | 10/2014 | Savard | ................ | H04L 41/5054 348/14.01 |
| 2008/0155634 A1 * | 6/2008 | Khedouri | .......... | G06F 17/30038 725/118 |
| 2011/0314497 A1 * | 12/2011 | Warrick | ................ | H04W 76/02 725/38 |
| 2012/0124177 A1 * | 5/2012 | Sparks | ................ | G06Q 20/123 709/219 |

* cited by examiner

*Primary Examiner* — Kieu Oanh T Bui
(74) *Attorney, Agent, or Firm* — Stewart M. Wiener

(57) ABSTRACT

Systems and methods here may be used to communicate wirelessly with a wireless user device, communicate with a media service provider by a network, communicate with a media equipment player, receive from the wireless user device, a request to access a media service by the media service provider, access media available by the media service provider and communicate the availability of the media to the wireless user device, and mirror playing of the media from the media service provider by the media equipment player.

23 Claims, 5 Drawing Sheets

MULTIMEDIA SERVICE MIRRORING

CROSS REFERENCE

This application relates to and claims priority to U.S. Provisional application 62/139,590 filed 27 Mar. 2015 which is hereby incorporated by reference.

FIELD

This application relates to the field of wireless networks, and more particularly to portability and consolidation of IP service access.

BACKGROUND

Many companies are now offering access to streaming internet services which require an account to access their content. Access to an account of a user and therefore content was previously restricted to home use.

SUMMARY

Systems and methods here may be used to a network device including a processor in communication with a memory and data storage, an access point (AP) subsystem and a low energy communication subsystem, the network device configured to, communicate wirelessly with a wireless user device, communicate with a media service provider by a network, communicate with a media equipment player, receive from the wireless user device, a request to access a media service by the media service provider over the network, communicate the availability of the media from the media service provider to the wireless user device, and receive a request from the wireless user device to mirror playing of the media from the media service provider by the media equipment player.

BRIEF DESCRIPTION OF THE DRAWINGS

In order to understand the embodiments and to see how it may be carried out in practice, embodiments will now be described, by way of non-limiting example only, with reference to the accompanying drawings, in which.

DETAILED DESCRIPTION

Figure 1:
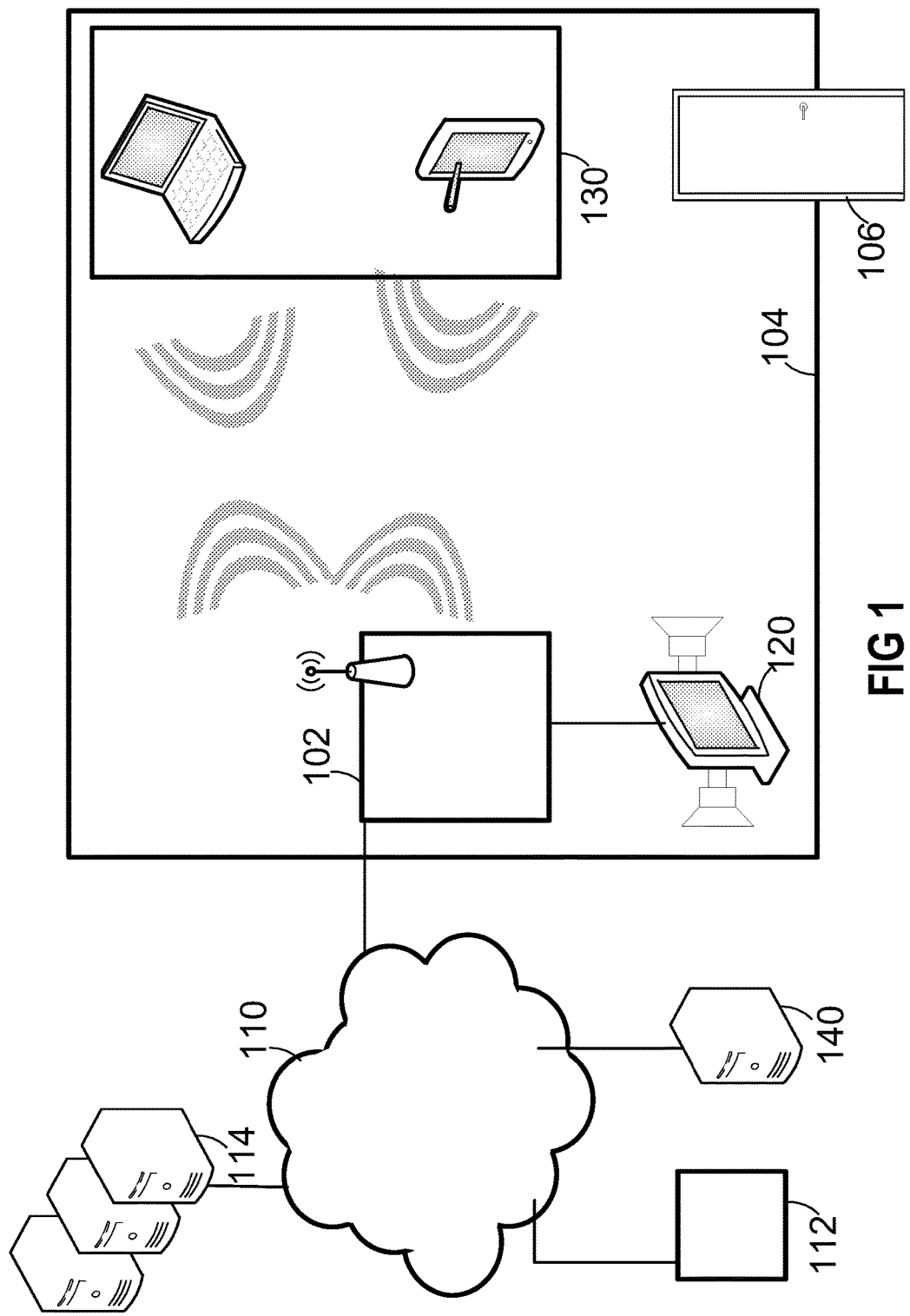
FIG. 1 is an example network diagram according to some embodiments.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the embodiments to these particular embodiments. In other instances, well-known data structures, timing protocols, software operations, procedures, and components have not been described in detail so as not to unnecessarily obscure aspects of the embodiments.

Overview

The methods and systems described here allow users with established accounts to media service providers, to access media from those accounts, and play the media on equipment that is not necessarily their home equipment or personal smartphone. The network systems which allow such access may include systems which are capable of: communicating with a user's wireless computing device, communicating with the media equipment located in the non-home environment, and communicating with the back end systems of the media service providers with which the users have accounts. The methods and systems described here include centrally managed networks that are capable of isolation and fencing using virtual local area networks (VLANs). Such VLANs may provide users with access to specific equipment and services, such as media equipment players in a hotel room to play the media from the media service providers, but not others such as equipment in another hotel room, another floor, or that the user did not choose to pay for.

It should be noted that the examples of users accessing equipment in their hotel room is merely exemplary. Such a system could be arranged in any environment such as an office, school, home, stadium, cafeteria, restaurant, or other venue.

Media Service Provider Examples

In the multimedia consumer world, media service providing companies offer users the ability to purchase a subscription account to a media service. Such a subscription account may include use of a set-top-box and/or software application which is used to communicate with media service provider back end systems. Through this communication and account, the user is able to play the media available through the media service provider on their own home media equipment players. Examples of such media service providers include but are not limited to Airplay, Apple TV, Amazon TV, Miracast, Google TV, Google Play, Chromecast, HBO NOW, Netflix, Hulu, as well as audio streaming services such as Spotify and Pandora.

But access to such streaming content and services was previously restricted to a set-top box left at the home of a user, or, by an application found on a portable device such as a laptop or smartphone. Because of this, when a user visited a venue outside of their home, such as hotel or another house for example, their paid-for subscription service could not follow them or be accessed on the non-home or locally available multimedia equipment. They were instead limited to accessing the services through their portable smart computing device which usually utilize a smaller screen/speakers than non-portable media players. In such situations, even if a user found herself surrounded by large screen televisions and high end audio equipment, she was unable to utilize this equipment to play the media for which she had already paid.

With the network systems and methods here, a user is able to mirror the home access of any media service provider in a non-home environment. This allows the user to access any of their subscription based accounts, or other media accounts, and enjoy the media they prefer on non-portable media equipment players, even when they are not at home.

In certain embodiments, the network systems here may be used to create a personal area network or VLAN which can make services available by a wireless internet connection to the devices of a user. Such an arrangement may allow for any kind of customization by network system operators, such as a hotel chain or other provider of the network systems. In certain examples, the provider of the network systems may utilize a software application for installation on wireless user devices in order for the network system to ensure the wireless user device can access the appropriate network. In certain examples, a central management system may be used in conjunction with the network systems here for such personal area network and/or VLAN creation.

An additional feature includes association and configuration of a user device, if the user device has been previously authenticated by the network system. In such an example, the wireless user device may enter a room and be presented with her own subscription based multimedia streaming services available on the media equipment player which is in the room.

It should be noted that the terms user device, smart wireless user device, smartphone, and derivations of such terms, could be any number of user devices, and is not intended to be limiting. For example, such user devices could be a smartphone, a tablet computer, a laptop computer, a phablet computer, a wearable computer such as a watch or glasses, or any other such device capable of computing and wireless communication.

It should also be noted that the term wireless refers to communication by radio waves and is not intended to be limiting. Such communication could be by a low power system such as that used by low energy such as Bluetooth Low Energy, or Near Field Communication, it could be a WiFi communication (802.11), cellular such as 4G Long Term Evolution (LTE), 3G cellular, 5G cellular, pico cell system, infrared, or any other such system.

Example Network

FIG. 1 is a diagram showing an example system and how it may interact with a wireless user device, the media viewer and back end media service provider services over a network such as the internet. In the example of FIG. 1, the network system 102 is a network device, shown in a room 104 such as a hotel room, shown with walls (and a door 106 to the room). The network system may include various features, including but not limited to, a memory, data storage, processor, antennae, and user interface as later described in FIG. 5. The network system 102 may include any number of subsystems with various functionality. One example subsystem may be an AP subsystem to provide WiFi connectivity to wireless user devices. In such a way, the network system 102 may have capabilities of an access point (AP) in a WiFi network configured to provide internet access to wireless user devices. Additionally or alternatively, the network system 102 may include any other number of subsystems with various functionality for other forms of communication such as but not limited to wireless communications systems mentioned above and wired communication such as through an Ethernet and/or fiber optic connection. Through these communication features, the network system 102 may communicate with any of various servers over the internet, it may communicate with any of various user devices which are in range of its wireless communication systems. It may communicate with any of various media equipment in order to cause media to play on such equipment.

The network system 102 may be loaded with or have access to instructions such as computer software that its processors may execute in order to perform certain functions. Such software functions may include mirroring any of various media service providers for a user who has access to such media services. Such software may be configured to utilize login credentials from a user device, for a user account, and access the back end systems of a media service provider to access the media services available for that account. In certain example embodiments, the network system 102 does not receive login credentials. Instead, an application running on the wireless user device passes login credentials to the back end systems of media service provider to access the media services. Software in the network system 102 may also include software capable of individualizing or personalizing its offered services for a particular user, based on information which the user previously input to the network system, or that the network system was able to access according to the user's media service provider account information.

In FIG. 1, the network system 102 is shown connected to a network such as the internet 110 and also to local media equipment 120. The media equipment player 120 (shown as a television with speakers) could be any number of things, such as a smart television, a projector, monitor, set-top box, video game system, or some other media viewer, as well as an audio player or speaker system for playing audio signals. The network system 102 is shown connected to the media equipment player 120 and the internet 110 by wired connections, but wireless connections or a combination of wired and wireless connections could be used.

The user devices 130 are shown in the room 104 as well, in communication with the network system 102. These user devices 130 may be loaded with applications which are capable of accessing the media service providers and thereby media to play. Thus, when a user device 130 allows the network system 102 to accesses its media service provider account, both their own subscription streaming service and the network systems 102, they are then able to play or mirror their media content from the service on the local media equipment 120 while controlling the service(s) by their user device 130.

In certain example embodiments, the user of the user device 130 may have previously established an account with a media service provider such as a subscription media streaming service. The media service provider system may include any number of back end systems 114. For example, a media service provider system may be any number of media providers including the non-limiting examples of Airplay, Apple, Amazon TV, Miracast, Google TV, Google Play, Chromecast, HBO NOW, Netflix, Hulu, as well as audio streaming services such as Spotify and Pandora. Users of such media service providers may have established accounts with them that allow the user device such as a smartphone, to access their media service provider account and stream and/or download media. Additionally or alternatively, such a media service provider may utilize a user set-top-box 112 at another location, for example at the home of a user. This set top box may be connected to the internet 110 and capable of communicating with the network system 102 here.

In certain embodiments, the network system 102 may connect to a television and allow the user to access the media service provider media by tuning the television to a specific channel. This kind of arrangement would avoid the user needing to change the television source input from to an external cable input.

Wireless Provider—Central Management

In certain example embodiments, the network system 102 may include features which allow it to operate as a fully capable networking device. For example, as shown in FIG. 1, the network system 102 may function not only as a set-top-box network device but also as a WiFi access point (AP), and/or cellular AP, such as for example an LTE AP, capable of being centrally managed by a controller, or a server capable of mirroring multi-media services 140 and/or other central management back end system(s) to provide internet connectivity and/or other network connectivity. The example of a WiFi functionality could include meshing capability, for example, the ability for the centrally managed network to allow communication with other mesh enabled APs or other mesh enabled wireless systems within range to establish network connectivity among various APs.

According to certain embodiments here, the network system 102 with networking capabilities may allow a provider of the overall service, for example, a hotel, to use the network system 102 as the only wireless network device in each room. So instead of needing a multiple networks and antennae for each of a television, set top box, WiFi AP, cellular and audio system, for example, the network system 102 here may provide the only functionality needed. This may include full WiFi AP functionality, cellular connectivity and the ability to communicate with local media equipment.

Certain example embodiments may allow for the network system 102 to work as or in conjunction with a central management system for creation of personal networks and/or VLANs as described herein.

Low Energy Examples

Alternatively or additionally, certain embodiments of the network system 102 may include the ability to communicate using a variety of low energy, short range and/or near field communication methods using one or more protocols. Examples include but are not limited to Bluetooth Low Energy, near field communications NFC, infrared, or other low energy methods. Such low power communications may allow the network system 102 to communicate with a nearby wireless user device. Such connections may be for any of various data transfers such as signaling channel changes, media selection, volume adjustments, menu navigation, etc. A low energy communication may also connect the network system 102 to any of various local media equipment 120 to play the accessed media.

Wired Such as Ethernet and HDMI Examples

In certain example embodiments, the network system 102 may include wired Ethernet connectivity and/or high-definition multimedia interface HDMI connectivity. In such embodiments, using a multi-port Ethernet connection and/or HDMI connection, the network system 102 may connect to nearby media equipment such as a television, stereo system, speaker, or other display. The network system 102 may also connect to a local area network LAN or larger network such as the internet 110 through an Ethernet connection. In certain examples, other connections such as fiber optic, coaxial cable, connection may be used instead of or in conjunction with an Ethernet connection.

Mirroring Service Examples

In certain example embodiments, the network system 102, may utilize software to mirror the media service provider functionality to which the user has access, in a non-home environment. Using such software, the network system 102 could access the user's established account with the third party media service provider and access the available media to play on local media equipment 120. Such access may be gained by the the user sending login information to the network system 102 so that the network system 102 may access the back end media service provider 114 over a network such as the Internet. In certain embodiments, an application on the wireless user device 130 may access the media service provider back end 114 and the wireless user device 130 can stream media to the network system 102 by a wireless communication such as WiFi.

In either example, the network system 102 is provided access to the media service provider media, which it may send to the local media equipment 120 for play. No specific application need then be loaded on the network system 102 to access media service provider media. Likewise, the television or other media equipment may not need to load a separate application. Instead, the network system 102 may be connected to the room media equipment so that the television need only be tuned to a particular channel or input selected and the user smartphone 130 can control the media by the media service provider 114.

Such an arrangement would allow a hotel, for example, to utilize just one piece of hardware for all applications, instead of supporting only one preferred system. Additionally, such a system could be reconfigured to adapt to new modifications, protocols and/or future multimedia streaming services that users may employ, thus allowing flexibility for future and as yet unknown media services.

Configurable Personality Examples

In certain example embodiments, the network system 102, alternatively or additionally, may be able to configure itself for individual users. For example, the network system 102 could allow configuration by a system administrator of multiple VLANs, security, authentication, isolation/fencing, and location based services for individual smartphones operated by individual users. Such customization could be arranged so that after initial setup, the user device is able to automatically connect and receive the services described here, without multiple setup iterations and without having to reconfigure or enter passwords for each access session.

In a hotel example, where a user is using a device which is HotSpot 2.0 (HS2.0) capable, and the user has already authenticated their wireless user device by a HS2.0 application, configuration may be automatic as soon as the user enters their assigned room with their user device. In the example of FIG. 1, when the user enters a hotel room 106 and her smartphone 130 connects to the network system 102, because she has previously authenticated her device with HS2.0, the network system 102 automatically informs her that a menu of media service providers are available to be used on the big screen television provided.

VLAN Examples

In certain example embodiments, the central management of the network which includes the systems 102 here, may allow for the creation of various private networks and/or virtual local area networks VLANs. A VLAN may refer to a data link layer construct that can allow a system administrator to segment a network. Such segmenting may allow the administer to group users and limit access of users to particular equipment or features. A user may then have access to their VLAN and the network system in their hotel room and the television and radio in their hotel room, but not equipment in other rooms. Additionally, the VLANs could be set to time out, for example when a user is supposed to check out of their hotel room, so that access is restricted.

In certain examples, the systems 102 may utilize dynamic VLANs. Such dynamic VLANs may include utilization of a device identification to assign switch ports. When a wireless user device first communicates with the network, a database including information about the VLAN membership may be queried by the switch for the assignment determination.

Such central management of the network system may also allow for security of the network system to be centrally managed using various back end security servers. The network system could utilize a standards based and compliant wireless security protocol and authentication with user devices.

In certain example embodiments, the network system 102 may be able to isolate or fence its service to individual users. Without such an isolation system, in a space with multiple devices in range, a user could, through her wireless user device, see any equipment in range and each would be available. Instead, isolation arrangement could allow a user to only see what devices the hotel has arranged, for example, the television in the room she is assigned, the stereo in the room she is assigned, and nothing else from any of the other rooms. Similarly, other hotel guests on her floor would not able to see and/or access the devices that are in her room. Each would be isolated and/or fenced to the devices in their own specific room.

Certain example embodiments of the network system 102 are able to identify, based on location, which services are available for each user at a particular time. For example, if the user with her smartphone walks into a room with a printer, that printer becomes available to the user. If the user walks into a room with a projector, that projector becomes available to her. And as a user moves, the location based resources update as well. Such a location based arrangement may allow for the customization of relevant resources for each individual user. Additionally, instead of bombarding each user with irrelevant information, such as all the printers on the floor, the network system 102 is able to present just the relevant resources for each individual user, based on local resources.

In certain example embodiments, the user smartphone may be able to utilize HotSpot 2.0 (HS2.0) or other similar service in order to authenticate and be managed by the VLAN. In such a service, the HS2.0 system may identify wireless user device and associate an identification of the wireless user device to the user's HS2.0 account. When the user checks into the hotel, for example, the hotel application on the user's smartphone recognizes that the user is assigned to a certain room, and thereby to the VLAN established for that room. The network system 102 provides for central management of a VLAN for the user's particular room, and the user's smartphone, through the hotel application, is given access to that VLAN but to no other room's VLANs. This can allow for each room, or each floor or other grouping of rooms to be assigned their own VLAN with only the registered guests being allowed access to that VLAN.

Authentication Examples

To utilize the services of the network system 102, the user device may need to authenticate her device in some manner. This can be done in any of various ways, such as by using a proprietary software application on the wireless user device for the service provider, such as the hotel in which the user is visiting. Other ways include a HS2.0 user who has previously authenticated her device using the HS2.0 software when she first established her HS2.0 credentials. There could be any kind of username/password combinations which are issued by a system administrator. Thus, there are any number of ways that a user first authenticates, but once that initial authentication is complete, the authenticated user device may be automatically able to use the customized arrangement of services without subsequent logins.

Example Signal Sequences

Figure 2:
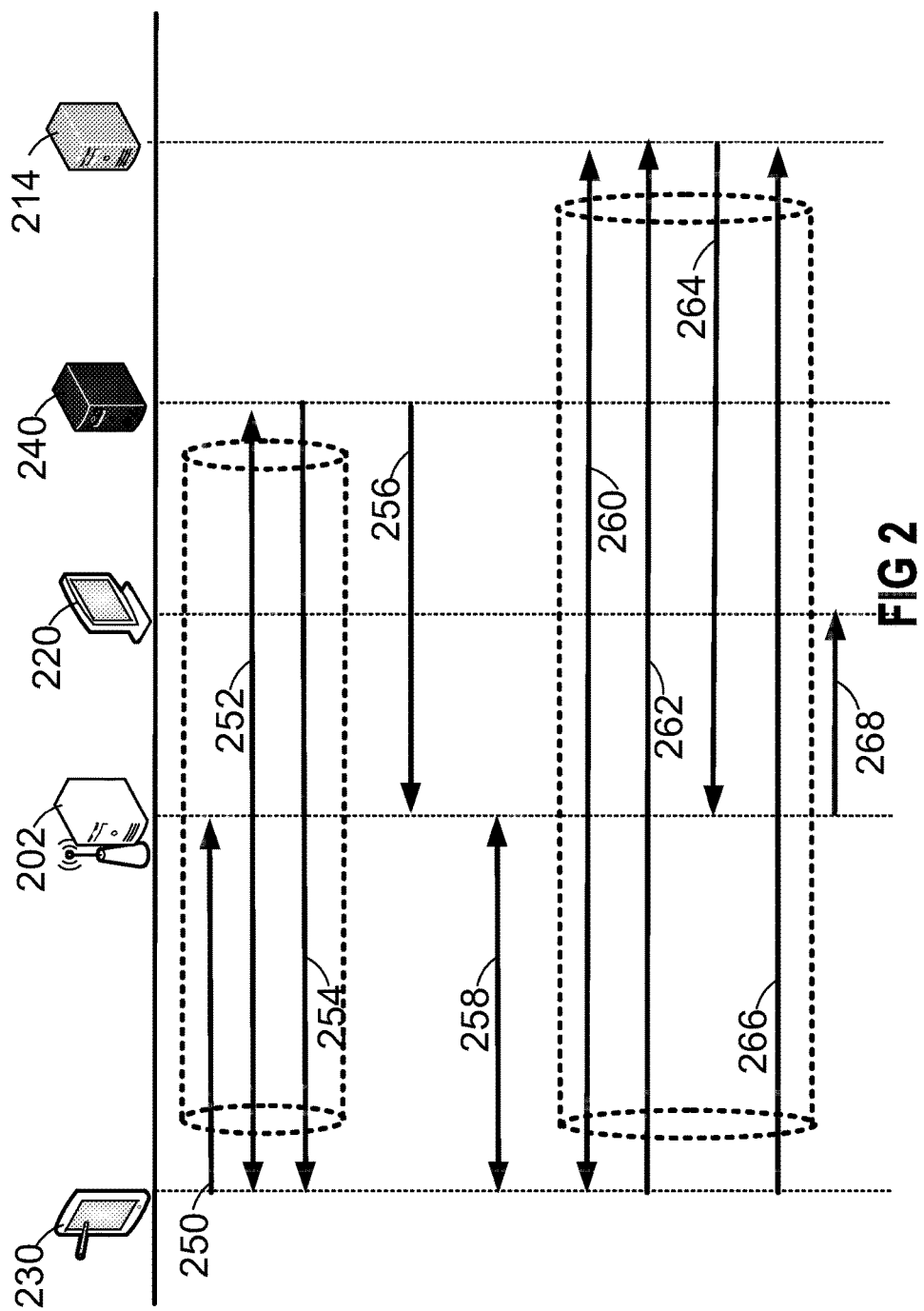
FIG. 2 is an example diagram showing a communication sequence diagram according to some embodiments.

FIG. 2 shows example communication sequences which may be used in certain embodiments herein. FIG. 2 shows signals among a user device 230, the network system 202 as described here, a media equipment 220 such as a television, a media service provider server 214 such as a streaming media company and a server 240 which operates the local network system, such as the hotel media server. Again the example in FIG. 2 is a hotel guest, but this example is not intended to be limiting.

In FIG. 2, a guest walks into a hotel room with their user device 230. The user device 230 associates 250 to the WiFi AP subsystem which is part of the network system 202. The user device 230 then authenticates to the WiFi network 252 which includes the server 240 such as the hotel media server. In certain example embodiments, a first setup authentication may allow for later automatic authentication for a user on the network. This authentication pairs the user device 230 with the server 240 using the same credentials. The server 240 can then assign the user device 230 a key as part of the guest authentication pairing for streaming media 254. This onboarding could be secure using HotSpot HS 2.0 or 802.1x based authentication in certain example embodiments.

Next, the server 240 assigns the user device 230 a private network 256. The assignment of a private network could be using dynamic VLANs for example as described herein.

Next, the guest can be notified natively or through a mobile application on their user device 230 that streaming media to the media equipment such as the hotel room's television is available 258.

Next, the guest, using their user device 230, authenticates with the media service provider 214 using their own personal credentials 260. The credentials could be any kind of login and password, biometrics, or other kind of credentials arranged between the user and the media service provider. In certain examples, such passing of login credentials is accomplished from an application running on the wireless user device 230 and passed directly to the media service provider 214. Such an embodiment would bypass handling the underlying login credentials by the network system 202 itself. After that, the guest may cause their user device 230 to request media content 262 from the media service provider 214. Upon request, the media service provider 214 streams media content 264 to the network system 204. The guest, using their user device 230 may control the media 266 play by communicating with the media service provider 214. Control may be selection of a program, control of a playing program such as pause, fast forward, rewind, stop and/or play. Any kind of navigation of menus from the media service provider could be controlled by the user device 230.

Finally, the network system 202 mirrors the media content 268 to the media equipment 220. This allows the media content to be played on whatever media equipment 220 that is available in the location, such as a television in the hotel room the guest is visiting.

Example Flow Sequence

Figure 3:
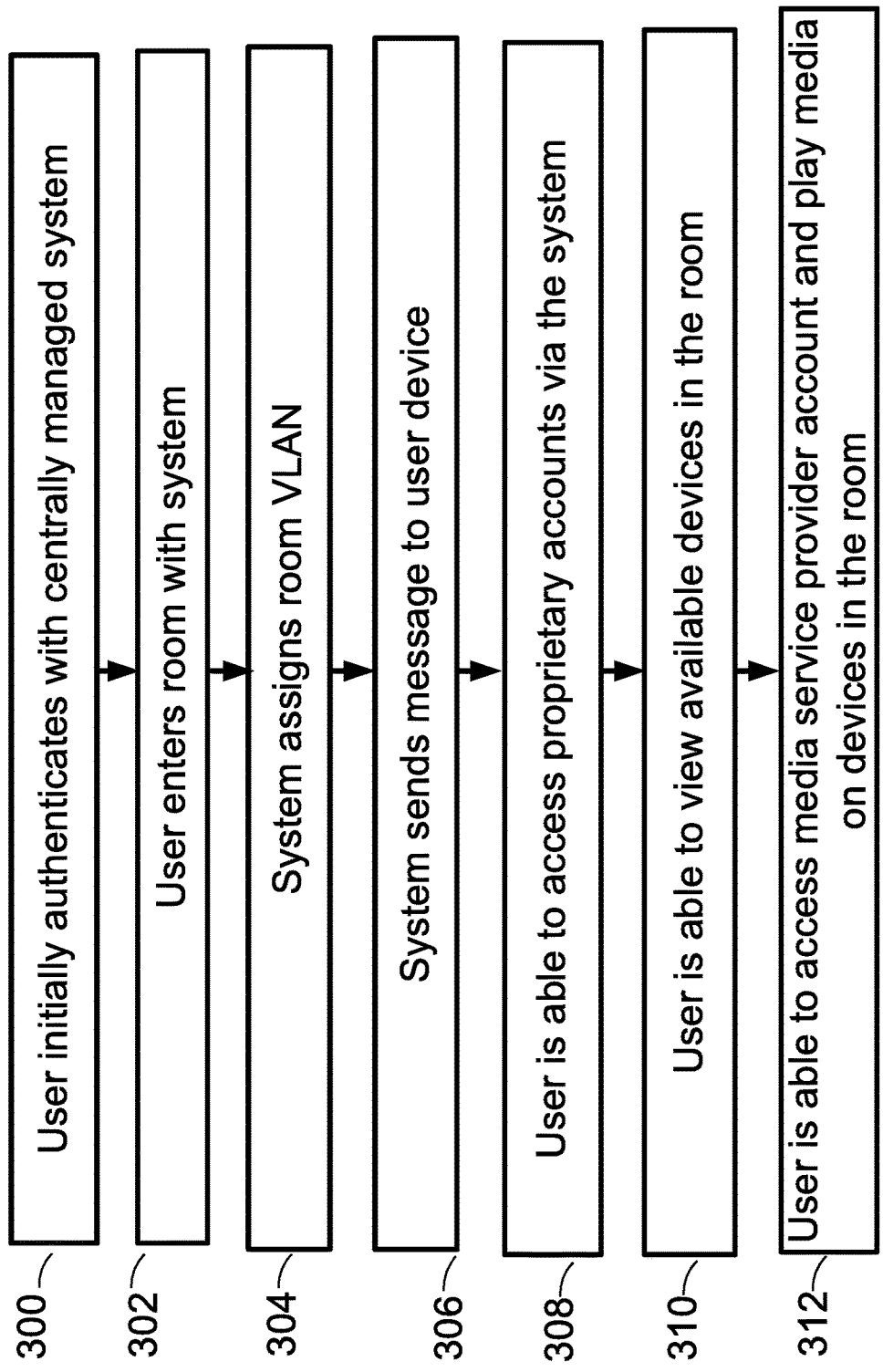
FIG. 3 is an example flowchart depicting an example set of steps according to some embodiments.

FIG. 3 is a flow chart depicting an example set of steps which allow for a user to access their media service providers' media according to certain embodiments described herein. In this non-limiting example, a user utilizes certain media equipment available in a hotel room that she has checked into, to stream videos from her subscription streaming movie account.

In FIG. 3, the user, by a user device, first authenticates her device with the overall centrally managed system 300. This authentication may allow for the user to avoid subsequent authentication sessions. And such authentication, depending on the network system, could be automatic and seamless to the user, where an initial authentication is stored by the network system to allow automatic authentication after the initial authentication, for example, through a system such as HotSpot 2.0. Upon entry, the hotel WiFi network authenticates her user device based on the previous interaction. In some examples, the user may authenticate using an application specific to the location, such as a hotel specific application which the user has previously downloaded and authorized with her credentials. In some examples, the user may be given credentials when she first checks in and authenticates her user device through a web-based login arrangement. Other examples include the network system performing a Medium Access Control (MAC) address lookup, a Bluetooth Low Energy authentication, a proprietary guest pass acceptance, and/or an independent third party authentication system. Whichever way the network system is configured to initially authenticate the user's device, after the initial authentication, the network system is then able to automatically configure for the individual user as described below.

For example, after the user authenticates using her hotel application on her user device smart phone, she checks into the hotel and goes up to her assigned room. She enters the room which is equipped with the network system described here 302. The network system then sends a message 306, wirelessly, to the user device which indicates the availability of any of various media service provider services which are available to access. For example, upon entering, she may see the availability of a list of media service providers including her Amazon Prime TV and premium sound for her Spotify accounts. She may see the available networked television. She may see a channel guide for the television which includes the number of the channels used to access the various media service provider media.

Once the user sees this message on her device, she is able to then gain access to the media service provider media by an authentication which ties the user device to her media service provider account, and allows the network system to access the media service provider media using the media equipment provided by the hotel 308. And because the network system in the example includes a VLAN arrangement, the user is also able to view any other available devices which are also on that particular VLAN, for example, other devices in the user's room 310. In the VLAN example arrangement, this is can be an isolated view, as the network system is able to compartmentalize this particular user's account, and not show all available systems on the floor, but merely the devices the network administrators determined should be available to this user.

Next, once the user is properly authenticated, the network system is then able to stream, by the users' device, the user's desired media by their media service provider. The network system can then play the media on the local media equipment available in the room 312. In this way, the user's home subscription based media service is mirrored in a hotel or other location by a relay of the media service and streaming of the media to media equipment players.

Isolation Examples

Figure 4:
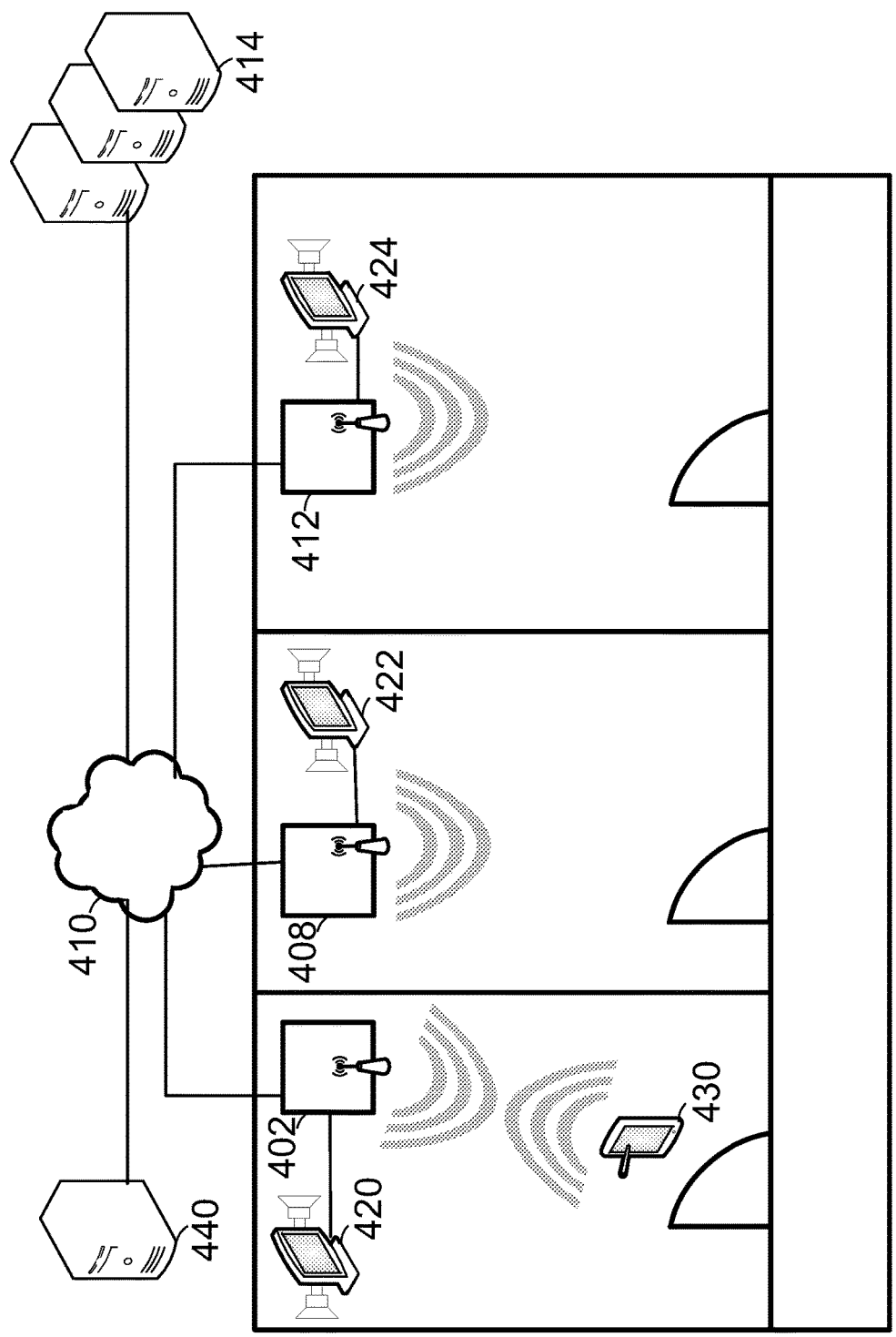
FIG. 4 is an example network diagram showing an isolation example according to some embodiments.

FIG. 4 shows an example of how the network system may be able to isolate individual user's ability to see and access particular equipment, in this case, in an example using hotel rooms. In the example, similar to FIG. 1, individual hotel rooms are shown equipped with the network system 402 as well as any kind of local media equipment 420. In the example, each room has its own respective systems 408, 412 and multimedia devices 422, 424. The network systems 402, 408, 412 are all shown in communication with the internet 410 and thereby any of various media service provider back ends 414 which allow users to access media such as music, movies, etc.

The network systems 402, 408, 412 in this example, include WiFi access point capabilities, among the media networking capabilities. These network systems 402, 408, 412 are centrally managed in this example, by a controller 440 or other device such as a server to manage mirroring multi-media services as described herein (such controller can be locally based or remotely based). The central management of the various network systems 402, 408, 412 allow for the VLANs to be established for any arrangement, such as for each hotel room in the example of FIG. 4.

In this example, when a user who has been authenticated by the overall centrally managed system, walks into her hotel room with a user device 430, she is presented with the network system 402 and features 420 of her particular room only. Thus, even though the adjacent rooms have systems 408, 412 which are capable of communication with her user device 430, they do not appear visible to her, and are not able to be accessed by her user device 430. Likewise, a guest in one of the other rooms would not be able to see this users'system 402 or media equipment 420. The result is a fenced, or, isolation system which allows for users to be confined to his or her own customized features, while keeping neighbors out.

Any kind of arrangement of accessible equipment could be arranged in the VLAN arrangement as explained herein.

Example Computing Equipment

Figure 5:
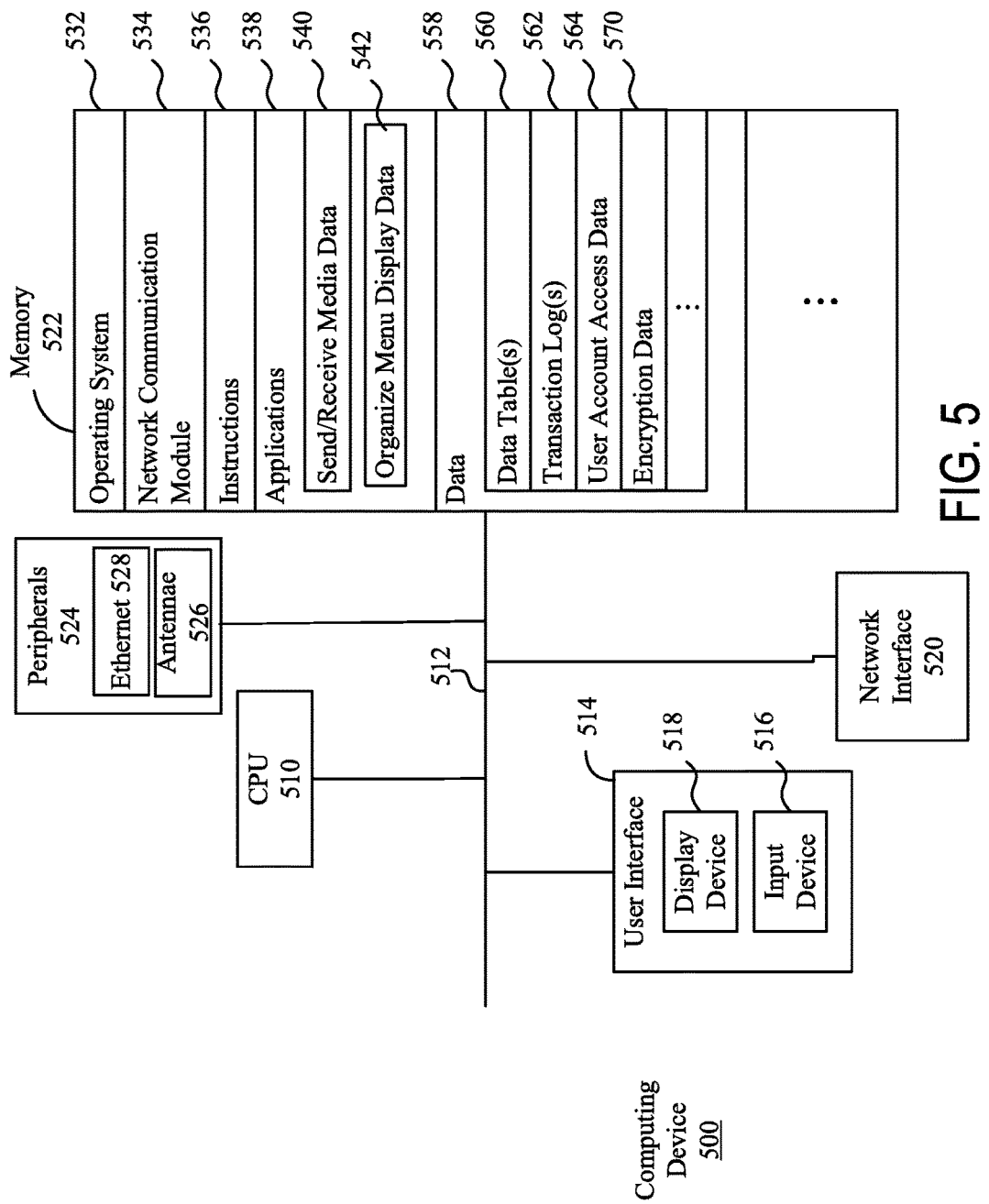
FIG. 5 is an example networking device according to some embodiments.

FIG. 5 shows an example piece of computing equipment 500 such as the network system 102 from FIG. 1 used as described herein. The computing device 500 of FIG. 5 is shown with a central processor CPU 510 that could include any number of computer processors. The CPU 510 is shown in communication by a bus 512 or other way to a number of features including a user interface 514. The user interface 514 could include a display 518 such as a screen or lights and/or input device 516 such as a touchscreen, buttons, keyboard, mouse, wheel, rollerball, joystick, etc. The CPU 510 is also shown in communication with a network interface 520 as well as peripherals 524 such as antennae 526 for the various wireless communications such as WiFi, cellular, infrared, Bluetooth Low Energy, etc. Also shown is an Ethernet 528 connection which could be any kind of wired connection. The CPU 510 is also shown in communication with a memory 522. The memory includes software instructions which are executed by the CPU 510 to perform tasks. The memory 522 is shown including an operating system 532 a network communication module 534, instructions for other features 536 and applications 538 such as sending and receiving media data 540 and organization of menu display data 542. The data storage 558 includes storage of various data arranged in a data table 560, transaction log 562, which can store user account access data 564 and encryption data 570.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

The innovations herein may be implemented by one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the innovations herein may be achieved by implementations with disparate or entirely different software, hardware and/or firmware components, beyond that set forth above. With regard to such other components (e.g., software, processing components, etc.) and/or computer-readable media associated with or embodying the present embodiments, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved by or performed by logic and/or logic instructions including program modules, executed in association with such components or circuitry, for example. In general, program modules may include routines, programs, objects, components, data structures, etc. that perform particular tasks or implement particular instructions herein. The embodiments may also be practiced in the context of distributed software, computer, or circuit settings where circuitry is connected by communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware by a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present embodiments may be implemented by computer-hardware, software and/or firmware. For example, the network systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertains that variations and modifications of the various implementations shown and described herein may be made without departing from the spirit and scope of the embodiments. Accordingly, it is intended that the embodiments be limited only to the extent required by the applicable rules of law.

What is claimed is:

1. A network system comprising:
a network device including a processor in communication with a memory and data storage, an access point (AP) subsystem and a low energy communication subsystem, the network device configured to,
associate with an application running on a wireless user device;
authenticate the wireless user device to a hotel network;
assign a virtual area network (VLAN) to the wireless user device and resources;
communicate the availability of the resources in the VLAN to the wireless user device,
wherein the available resources includes local media equipment;
communicate with multiple third party media service providers;
automatically present the multiple third party media service providers as options to the wireless user device;
receive, from the application running on the wireless user device, a selection of one of the multiple third party media service provider options;
receive, from the application running on the wireless user device, a login credential correlating to the selected third party media service provider;
access the selected third party media service provider, by the network, using the received login credential;
receive indications of available media from the selected third party media service provider;
communicate the availability of the media from the selected third party media service provider to the application running on the wireless user device
receive, from the wireless user device, a request to access a selection of available media; and
cause play of the selected media from the third party media service provider using the received login credential, on the local media equipment.

2. The network system of claim 1, further comprising, at least one of, a multi-port Ethernet connection and HDMI connection for communicating with the media equipment player.

3. The network system of claim 1 wherein the network device is further configured to,
isolate services available to the wireless user device based on network authentication credentials of the wireless user device.

4. The network system of claim 1 wherein the AP subsystem is at least one of a WiFi AP subsystem and an LTE AP subsystem.

5. The network system of claim 1 wherein the media equipment player is a television; and
wherein the network system is further configured to allow access to the playing media on the television by tuning to a channel on the television.

6. The network system of claim 1 wherein the low energy subsystem is a Bluetooth Low Energy subsystem.

7. The network system of claim 1 wherein the network system is configured to utilize an assigned private network for the wireless user device by the AP subsystem.

8. The network system of claim 2 wherein the communication is through the connection for at least one of,
the media service provider by the network; and
the media equipment player.

9. The network system of claim 1 wherein the network device is also in communication with a central network controller for controlling network access by the AP.

10. A non-transitory computer-readable medium having computer-executable instructions thereon for a method of mirroring media services, the method comprising:

by a network device,
providing access to a hotel network to a wireless user device by an AP subsystem;
assigning a virtual area network (VLAN) to the wireless user device and resources;
communicating the availability of the resources in the VLAN to the wireless user device,
wherein the available resources includes local media equipment;
communicating with an application running on the wireless user device by a low energy subsystem;
automatically presenting the multiple third party media service providers as options to the wireless user device;
receiving from the application running on the wireless user device a request to access one of the third party media service provider from the presented third party multiple service providers;
receiving, from an application running on the wireless user device, a login credential correlating to the selected third party media service provider;
accessing the selected third party media service provider, by the network, using the received login credential;
receiving indications of available selected third party media service provider media from the selected third party media service provider;
receiving media from the media service provider by the network, based on the credential; and
mirroring play of media from the media service provider on the local media equipment player.

11. The non-transitory computer readable medium of claim 10 wherein the providing network access to a wireless user device by the AP is by communication with a central network controller.

12. The non-transitory computer readable medium of claim 11 wherein the mirroring playing of media from the media service provider by the network device is by at least one of a multi-port Ethernet connection and HDMI connection.

13. The non-transitory computer readable medium of claim 11 wherein the providing network access to the wireless user device by the AP is by an assigned virtual local area network for the wireless user device.

14. The non-transitory computer readable medium of claim 11 wherein the mirroring play of media from the media service provider by the network device on the media equipment player is by a television and the mirroring is by a channel on the television.

15. The non-transitory computer readable medium of claim 10 wherein the AP subsystem is a WiFi AP subsystem.

16. The non-transitory computer readable medium of claim 10 wherein the AP subsystem is an LTE AP subsystem.

17. The non-transitory computer readable medium of claim 10 wherein the low energy subsystem is a Bluetooth Low Energy subsystem.

18. The non-transitory computer readable medium of claim 15 wherein the WiFi AP subsystem is configured to be centrally managed.

19. A non-transitory computer-readable medium having computer-executable instructions thereon for a method of mirroring media services, the method comprising:

by a networking device with a wireless access point (AP) subsystem, wireless low energy subsystem, and network interface,
associating a wireless user device to the AP subsystem;
providing hotel network access to the wireless user device;
sending an authentication request to a central server for the wireless user device;
assigning a virtual area network (VLAN) to the wireless user device and resources;
communicating the availability of the resources in the VLAN to the wireless user device,
wherein the available resources includes local media equipment;
communicating with an application running on the wireless user device by the low energy subsystem;
automatically presenting the multiple third party media service providers as options to the wireless user device;
receiving from the application running on the wireless user device a request to access a media service provider from a selection of multiple media service providers;
receiving, from the application running on the wireless user device, a login credential correlating to the selected third party media service provider;
accessing the selected third party media service provider, by the network, using the received login credential;
receiving indications of available media from the selected third party media service provider;
receiving media from the media service provider by the network; and
mirroring media play from the media service provider on the local media equipment player.

20. The non-transitory computer readable medium of claim 19 further comprising,
utilizing an assigned virtual local area network which allows the wireless user device access to only the computing device with wireless access point and only specific media equipment players.

21. The system of claim 1 wherein the network device is further configured to,
authenticate the wireless device; and
automatically determine, based on the authentication, which third party media service providers to present for selection.

22. The non-transitory computer readable medium of claim 10, wherein the method further includes,
authenticating the wireless device; and
automatically determining, based on the authentication, which third party media service providers to present for selection.

23. The non-transitory computer readable medium of claim 19, wherein the method further includes,
authenticating the wireless device; and
automatically determining, based on the authentication, which third party media service providers to present for selection.

* * * * *